(12) United States Patent
Srinivasan

(10) Patent No.: US 12,012,880 B2
(45) Date of Patent: Jun. 18, 2024

(54) SYSTEM AND METHODS FOR CONTROLLING FLOW DISTRIBUTION IN AN AFTERTREATMENT SYSTEM

(71) Applicant: Cummins Emission Solutions Inc., Columbus, IN (US)

(72) Inventor: Sriram Srinivasan, Greenwood, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 17/672,068

(22) Filed: Feb. 15, 2022

(65) Prior Publication Data

US 2022/0170406 A1  Jun. 2, 2022

Related U.S. Application Data

(62) Division of application No. 15/605,680, filed on May 25, 2017, now Pat. No. 11,286,835.

(51) Int. Cl.
*F01N 11/00* (2006.01)
*F01N 3/035* (2006.01)
*F01N 3/20* (2006.01)

(52) U.S. Cl.
CPC ............ *F01N 11/002* (2013.01); *F01N 3/035* (2013.01); *F01N 3/2066* (2013.01);
(Continued)

(58) Field of Classification Search
CPC ............... F01N 11/002; F01N 2560/06; F01N 2560/07; F01N 2560/08; F01N 2900/1406;
(Continued)

(56) References Cited

U.S. PATENT DOCUMENTS 8,640,445 B2    2/2014  Garimella et al.
2004/0065303 A1  4/2004  Russell et al.
(Continued)

FOREIGN PATENT DOCUMENTS

GB    2 530 203      3/2016
GB    2 536 029 A    9/2016
(Continued)

OTHER PUBLICATIONS

First Office Action issued for Chinese Patent Application No. CN 2018800330493, issued Feb. 2, 2021, 8 pages.
(Continued)

*Primary Examiner* — Phutthiwat Wongwian
*Assistant Examiner* — Diem T Tran
(74) *Attorney, Agent, or Firm* — Foley & Lardner LLP

(57) ABSTRACT

An aftertreatment system includes: a selective catalytic reduction (SCR) system including at least one catalyst; a particulate filter fluidly coupled to the SCR; a particulate filter out pressure sensor operatively coupled to an outlet of the particulate filter, the particulate filter out pressure sensor configured to measure a value of a pressure at the outlet of the particulate filter; a temperature sensor; an ambient pressure sensor; and a controller communicatively coupled with the particulate filter out pressure sensor, the controller configured to estimate an exhaust air mass-flow output from the aftertreatment system using a first output value from a particulate filter out pressure sensor, a first temperature output value from a temperature sensor, and a second output value from an ambient pressure sensor.

7 Claims, 5 Drawing Sheets

(52) U.S. Cl.
CPC ...... *F01N 2560/06* (2013.01); *F01N 2560/07* (2013.01); *F01N 2560/08* (2013.01); *F01N 2900/1406* (2013.01); *F01N 2900/1411* (2013.01)

(58) Field of Classification Search
CPC ............. F01N 2900/1411; F01N 3/035; F01N 3/2066; Y02T 10/12; Y02T 10/40
See application file for complete search history.

(56) References Cited

U.S. PATENT DOCUMENTS

| | | | |
|---|---|---|---|
| 2004/0118108 A1* | 6/2004 | Ripper | B01D 53/9495 60/285 |
| 2005/0086929 A1 | 4/2005 | Nieuwstadt et al. | |
| 2008/0202103 A1 | 8/2008 | Henderson et al. | |
| 2011/0166768 A1 | 7/2011 | Yamaoka et al. | |
| 2012/0204542 A1 | 8/2012 | Norris et al. | |
| 2012/0210700 A1 | 8/2012 | Sisken et al. | |
| 2013/0064718 A1 | 3/2013 | Onodera et al. | |
| 2015/0020504 A1 | 1/2015 | Nicole et al. | |
| 2015/0075143 A1 | 3/2015 | Gong et al. | |
| 2015/0322838 A1 | 11/2015 | Qi | |

FOREIGN PATENT DOCUMENTS

| | | |
|---|---|---|
| GB | 2 548 561 | 9/2017 |
| WO | WO-2016/202435 A1 | 12/2016 |

OTHER PUBLICATIONS

First Office Action issued for Indian Patent Application No. 202048050083, issued Jan. 31, 2021, 7 pages.
Foreign Action other than Search Report on GB 1916859.0 DTD Jul. 30, 2021.
International Search Report and Written Opinion issued for PCT/US2018/033229 issued Aug. 8, 2018, 14 pages.
Examination Report issued for UK Patent Application No. GB2203833.5, issued May 31, 2022, 1 page.
Search Report issued for UK Patent Application No. GB 2203833.5, issued Mar. 31, 2022, 1 page.

* cited by examiner

SYSTEM AND METHODS FOR CONTROLLING FLOW DISTRIBUTION IN AN AFTERTREATMENT SYSTEM

The present application a divisional of U.S. patent application Ser. No. 15/605,680, filed May 25, 2017, the contents of which are incorporated herein by reference in their entirety.

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. Stringent emissions including on-board diagnostics (OBD) requirements stipulated by different regulatory agencies requires the development of robust control algorithms to facilitate the operation of the entire system in an optimal manner. To reduce $NO_x$ emissions, a Selective Catalytic Reduction (SCR) process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia, aqueous ammonia, diesel exhaust fluid (DEF), or aqueous urea, is typically introduced into the exhaust gas flow prior to the catalyst chamber. To introduce the reductant into the exhaust gas flow for the SCR process, an SCR system may dose or otherwise introduce the reductant through a dosing circuit that vaporizes or sprays the reductant into an exhaust pipe of the exhaust system upstream of the catalyst chamber. The SCR system may include one or more sensors to monitor conditions within the exhaust system.

SUMMARY

In an embodiment, an aftertreatment system includes a SCR system including at least one catalyst, a differential pressure (dP) sensor operatively coupled to the SCR system, a temperature sensor, and a controller. The dP sensor is configured to measure a value of a differential pressure across the SCR system. The controller is communicatively coupled with each of the dP sensor and the temperature sensor. The controller is configured to determine a first output value from the dP sensor and a first temperature output value from the temperature sensor. The first output value from the dP sensor is indicative of the value of the differential pressure across the SCR system. The first temperature output value from the temperature sensor is indicative of a temperature of the SCR system. The controller is further configured to estimate an exhaust air mass-flow output from the aftertreatment system using the first output value from the dP sensor and the first temperature output value from the temperature sensor.

In another embodiment, an aftertreatment system includes a SCR system including at least one catalyst, a particulate filter fluidly coupled to the SCR, a particulate filter out pressure sensor operatively coupled to an outlet of the particulate filter, a temperature sensor, an ambient pressure sensor, and a controller communicatively coupled with the particulate filter out pressure sensor. The particulate filter out pressure sensor is configured to measure a value of a pressure at the outlet of the particulate filter. The controller is configured to determine a first output value from the particulate filter out pressure sensor, a first temperature output value from the temperature sensor, and a second output value from the ambient pressure sensor. The first output value from the particulate filter out pressure sensor is indicative of the value of the pressure at the outlet of the particulate filter. The first temperature output value from the temperature sensor is indicative of a temperature of the SCR system. The second output value from the ambient pressure sensor is indicative of a value of an ambient pressure. The controller is further configured to estimate an exhaust air mass-flow output from the aftertreatment system using the first output value from the particulate filter out pressure sensor, the first temperature output value from the temperature sensor, and the second output value from the ambient pressure sensor.

In another embodiment, an aftertreatment system includes a SCR system including at least one catalyst, a plurality of temperature sensors operatively coupled to the SCR system, an ambient pressure sensor, and a controller. The plurality of temperature sensors are configured to measure a plurality of temperature values of the SCR system. The controller is communicatively coupled with the plurality of temperature sensors and the ambient pressures sensor. The controller is configured to determine a first output value from a first temperature sensor of the plurality of temperature sensors, a second output value from a second temperature sensor of the plurality of temperature sensors, and a third output value from the ambient pressure sensor. The first output value is indicative of one of the plurality of temperature values of the SCR system. The second output value is indicative of one of the plurality of temperature values of the SCR system. The third output value is indicative of a value of an ambient pressure. The controller is further configured to estimate an exhaust air mass-flow output from the aftertreatment system using the first output value from the first temperature sensor of the plurality of temperature sensors, the second output value from the second temperature sensor of the plurality of temperature sensors, and the third output value from the ambient pressure sensor.

In some embodiments, upon determining the output values being used indicate valid data, the controller is further configured to estimate the exhaust air mass-flow output from the aftertreatment system. Estimating the exhaust air mass-flow output may comprise calculating a flow coefficient of the SCR system. Estimating the exhaust air mass-flow output may comprise calculating a flow coefficient and a density of the exhaust air mass-flow inside the SCR system. The exhaust air mass-flow output may be estimated using $m=\sqrt{2\rho\Delta P}$, wherein k is the flow coefficient implemented as $f((m_{est}))$, and $\Delta P$ is the differential pressure. The density may be estimated using $\rho=P_{bed}/(RT_{bed})$ wherein R is the universal gas constant, $P_{bed}$ is determined from data obtained about the pressure of a catalyst bed of the catalyst in the SCR, and $T_{bed}$ is determined from data obtained from a temperature sensor of the temperature of the catalyst bed of the catalyst in the SCR system. The value for k may be obtained from a mapping of steady-state data at different flow levels. In some embodiments, the aftertreatment system further comprises an exhaust air mass-flow sensor, wherein a value of exhaust air mass-flow is obtained from the exhaust air mass-flow sensor and the controller is further configured to compare the estimate exhaust air mass-flow to the value of exhaust air mass-flow obtained from the exhaust air mass-flow sensor.

BRIEF DESCRIPTION OF THE DRAWINGS

The details of one or more embodiments are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Following below are more detailed descriptions of various concepts related to, and embodiments of, methods, apparatuses, and systems for estimating exhaust air mass-flow in an aftertreatment system. The various concepts introduced above and discussed in greater detail below may be implemented in any of numerous ways, as the described concepts are not limited to any particular manner of embodiment. Examples of specific embodiments and applications are provided primarily for illustrative purposes.

One of the key signals that are required for doing robust control of the particulate filter system (PFS) and/or SCR sub-system is the exhaust gas mass-flow. Typically, information concerning exhaust gas mass-flow is measured on the engine side and sent to the aftertreatment system as a reference input. In some embodiments, when this value may no longer be reliable, an estimate for the mass-flow is determined, thereby enabling the system to continue normal operation of the aftertreatment functions such as reducing the tailpipe particulate matter (PM), hydrocarbons (HC), NOx emissions, etc. while minimizing the $NH_3$ slip to the extent possible. In some embodiments, the engine-side mass-flow sensor is removed, reducing the cost of the system while maintaining overall system performance. In some embodiments, the mass-flow is estimated and used as a diagnostic to detect mass-flow sensor errors. In some embodiments, the mass-flow is estimated and used as part of an OBD system to detect mass-flow sensor errors. The OBD margin for the sensors may be used to estimate the mass-flow on the engine side is increased if the mass-flow estimation is used as the primary estimate of the exhaust flow.

Internal combustion engines (e.g., diesel internal combustion engines, etc.) produce exhaust gases that are often filtered within an aftertreatment system. This filtering often occurs through the passing of the exhaust gasses through a substrate. Conventional filters encounter issues distributing the flow of exhaust gases on the substrate. For example, conventional filters may distribute a large portion of the flow near the center of the substrate and a small, or even a virtually nonexistent, portion of the flow near edges of the substrate. As a result, the exhaust gases in conventional filters experience a pressure drop.

Figure 1:
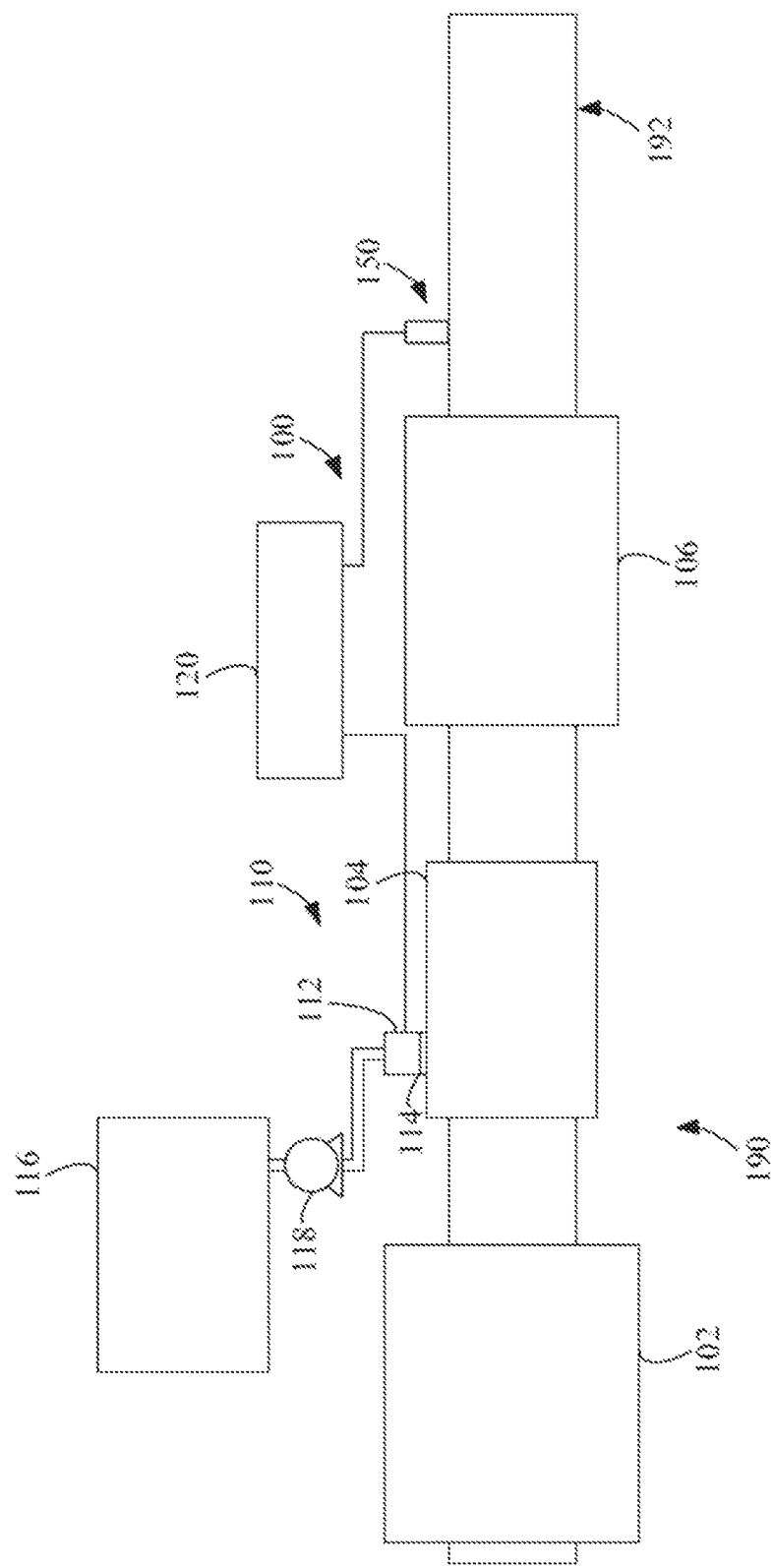
FIG. 1 is a schematic illustration of an aftertreatment system, according to an example embodiment.

FIG. 1 is a schematic illustration of an aftertreatment system 100, according to an example embodiment. FIG. 1 depicts an aftertreatment system 100 having an example reductant delivery system 110 for an exhaust system 190. The aftertreatment system 100 includes a particulate filter, for example a diesel particulate filter (DPF) 102, the reductant delivery system 110, a decomposition chamber or reactor 104, a SCR catalyst 106, and a sensor 150.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide. In some embodiments, the DPF 102 may be omitted.

The decomposition chamber 104 is configured to convert a reductant, such as urea or DEF, into ammonia. The decomposition chamber 104 includes a reductant delivery system 110 having a doser or dosing circuit 112 configured to dose the reductant into the decomposition chamber 104 (for example, via an injector such as the injector described below). In some embodiments, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or reductant to flow to the SCR catalyst 106.

The decomposition chamber 104 includes the dosing circuit 112 mounted to the decomposition chamber 104 such that the dosing circuit 112 may dose the reductant into the exhaust gases flowing in the exhaust system 190. The dosing circuit 112 may include an insulator 114 interposed between a portion of the dosing circuit 112 and the portion of the decomposition chamber 104 on which the dosing circuit 112 is mounted. The dosing circuit 112 is fluidly coupled to one or more reductant sources 116. In some embodiments, a pump 118 may be used to pressurize the reductant from the reductant source 116 for delivery to the dosing circuit 112.

The dosing circuit 112 and pump 118 are also electrically or communicatively coupled to a controller 120. The controller 120 is configured to control the dosing circuit 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory, which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), Erasable Programmable Read Only Memory (EPROM), flash memory, or any other suitable memory from which the controller 120 can read instructions. The instructions may include code from any suitable programming language.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes an inlet in fluid communication with the decomposition chamber 104 from which exhaust gas and reductant are received and an outlet in fluid communication with an end of the exhaust system 190.

The exhaust system 190 may further include a diesel oxidation catalyst (DOC) in fluid communication with the exhaust system 190 (e.g., downstream of the SCR catalyst 106 or upstream of the DPF 102) to oxidize hydrocarbons and carbon monoxide in the exhaust gas.

In some embodiments, the DPF 102 may be positioned downstream of the decomposition chamber or reactor pipe 104. For instance, the DPF 102 and the SCR catalyst 106 may be combined into a single unit. In some embodiments, the dosing circuit 112 may instead be positioned downstream of a turbocharger or upstream of a turbocharger.

The sensor 150 may be coupled to the exhaust system 190 to detect a condition of the exhaust gas flowing through the exhaust system 190. In some embodiments, the sensor 150 may have a portion disposed within the exhaust system 190; for example, a tip of the sensor 150 may extend into a portion of the exhaust system 190. In other embodiments, the sensor 150 may receive exhaust gas through another conduit, such as one or more sample pipes extending from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensors 150 may be utilized for detecting a condition of the exhaust gas, such as two, three, four, five, or six sensors 150 with each sensor 150 located at one of the foregoing positions of the exhaust system 190, such conditions including temperature, pressure, and/or differential pressure.

Figure 2:
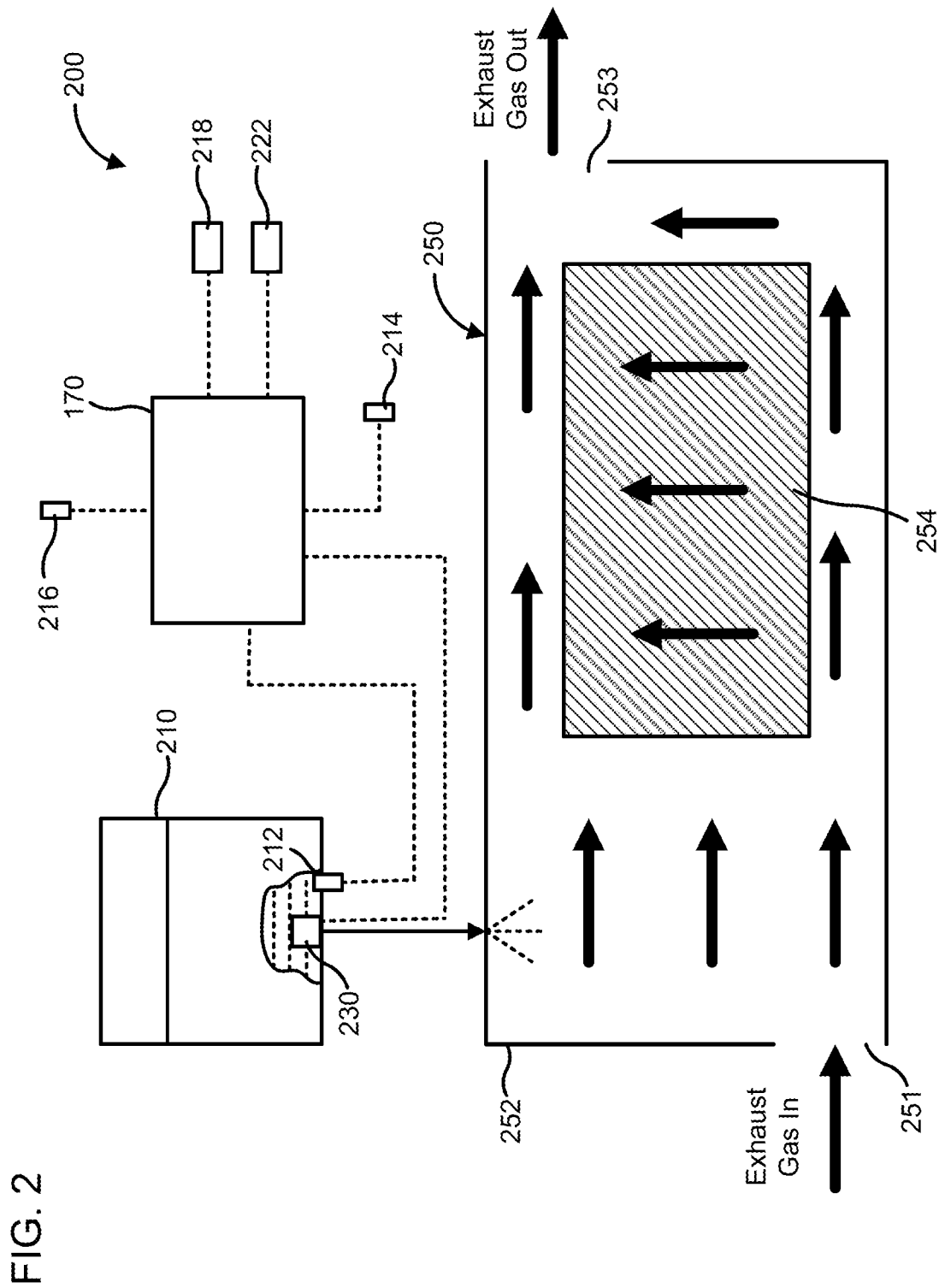
FIG. 2 is a schematic illustration of an SCR system showing the path of exhaust gas therethrough, according to an example embodiment.

FIG. 2 is a schematic illustration of an aftertreatment system 200 showing the path of exhaust gas, according to an example embodiment. The aftertreatment system 200 is configured to receive an exhaust gas (e.g., a diesel exhaust gas) from an engine (e.g., a diesel engine) and reduce constituents of the exhaust gas such as, for example, NOx gases, carbon monoxide (CO), etc. The aftertreatment system 200 includes a reductant storage tank 210, a reductant physical level sensor 212, a temperature sensor 214, a pressure sensor 216, a heater 230, an SCR system 250, a controller 170, an ambient temperature sensor 218, and an ambient pressure sensor 222.

The reductant storage tank 210 (also referred to herein as tank 210) contains a reductant formulated to facilitate reduction of the constituents of the exhaust gas (e.g., NOx) by a catalyst 254 included in the SCR system 250. In embodiments in which the exhaust gas is a diesel exhaust gas, the reductant can include DEF which provides a source of ammonia. Suitable DEFs can include urea, aqueous solution of urea or any other DEF (e.g., the DEF available under the tradename ADBLUE®).

The heater 230 is operatively coupled to the tank 210 and is configured to heat the reductant contained within the tank 210. Under cold, freezing or sub-zero weather conditions the reductant or at least a portion of the reductant contained within the reductant storage tank 210 can freeze. For example, the aftertreatment system 200 can be included in a vehicle which is exposed to the freezing weather conditions. When the vehicle is turned off or otherwise not operational, the reductant in the tank 210 freezes. When the vehicle is turned on, the heater 230 is switched on to thaw or melt the reductant. In particular embodiments, the heater 130 can be located inside the tank 210 (e.g., located proximal to or on a base of the tank 210) or positioned outside the tank 210 proximal to a base of the tank 210 so that a portion of the reductant proximate to the heater 230 melts first. However, it takes a certain amount of time for all or substantially all (e.g., greater than 90% of the volume of the reductant contained within the tank 210) of the reductant to thaw. Particularly, when the heater 230 is first turned on, a first portion of the reductant proximal to the heater 230 is liquid and a second portion of the reductant distal from the heater 230 is frozen.

The reductant physical level sensor 212 (also referred to as the physical level sensor 212) is operatively coupled to the tank 210. The physical level sensor 212 can include an ultrasonic level sensor configure to propagate ultrasonic waves through the reductant contained within the tank 210, and use reflected ultrasonic waves from the reductant to determine a physical level of reductant in the tank 210. The ultrasonic waves generated by the physical level sensor 212 only reflect from the liquid portion of the reductant.

The temperature sensor 214 or a plurality of temperature sensors 214 can be operatively coupled to various locations of the aftertreatment system 200 and configured to measure a temperature of components or enclosed fluids (e.g., liquid or gaseous fluids). The temperature sensor 214 can include a thermocouple, a thermistor or any other suitable temperature sensor.

The SCR system 250 is configured to receive and treat the exhaust gas (e.g., a diesel exhaust gas) flowing through the SCR system 250. The SCR system 250 is fluidly coupled to the storage tank 210 to receive the exhaust reductant from the storage tank 210. The SCR system 250 includes a housing 252 defining an inlet 251 for receiving the exhaust gas from an engine, and an outlet 253 for expelling treated exhaust gas. The SCR system 250 includes at least one catalyst 254 positioned within an internal volume defined by the housing 252. The catalyst 254 is formulated to selectively reduce constituents of the exhaust gas, for example, NOx included in the exhaust gas in the presence of an exhaust reductant. Any suitable catalyst 254 can be used such as, for example, platinum, palladium, rhodium, cerium, iron, manganese, copper, vanadium based catalysts (including combinations thereof).

In some embodiments, the catalyst 254 is disposed on a suitable substrate such as, for example, a ceramic (e.g., cordierite) or metallic (e.g., kanthal) monolith core which can, for example, define a honeycomb structure. A washcoat can also be used as a carrier material for the catalyst 254. Such washcoat materials can include, for example, aluminum oxide, titanium dioxide, silicon dioxide, any other suitable washcoat material, or a combination thereof. The exhaust gas can flow over and about the catalyst 254 such that any NOx gases included in the exhaust gas are further reduced to yield an exhaust gas which is substantially free of carbon monoxide and NOx gases.

The controller 170 is communicatively coupled to a pressure sensor 216 (e.g., a dP pressure sensor measuring differential pressure data across the SCR system 250) and a temperature sensor 214 and is configured to receive and interpret output values or signals generated by each of the sensors. In some embodiments, the controller 170 is configured to estimate the exhaust air mass-flow using dP sensor data and temperature sensor data. In some embodiments, the controller 170 is configured to estimate the exhaust air mass-flow using temperature sensor data and differential pressure across the SCR data. In some embodiments, the controller 170 is configured to calculate the differential pressure using the separate dP sensor operably connected to the SCR. The SCR, being a flow-through catalyst, acts as a flow restriction device.

In some embodiments, the controller 170 is communicatively coupled to an ambient pressure sensor 222 (e.g., a pressure sensor measuring ambient pressure), and a plurality of temperature sensors 214 and is configured to receive and interpret output values or signals generated by each of the sensors. The controller 170 is configured to estimate the exhaust air mass-flow using at least two temperatures across an SCR, and ambient pressure sensor data.

In some embodiments, the controller 170 is communicatively coupled to a temperature sensor 214, a pressure sensor 216, an ambient temperature sensor 218, and an ambient pressure sensor 222 (e.g., a pressure sensor measuring ambient pressure) and is configured to receive and interpret output values or signals generated by each of the sensors. The controller 170 is configured to determine if there is a sufficient combination of data from sensors that can then be used to estimate an exhaust air mass-flow.

The controller 170 can include a processor (e.g., a microcontroller) programmed to interpret the output signal. The controller 170 can be included in a control circuit (e.g., the control circuit 370 described herein) which is in electrical communication one or more of the components of the aftertreatment system 200 described herein and operable to perform the sensing and control functions described herein. The controller 170 can also be configured to receive and interpret data from, temperature sensors, NOx sensors, oxygen sensors, temperature, pressure, and/or ammonia.

Figure 3:
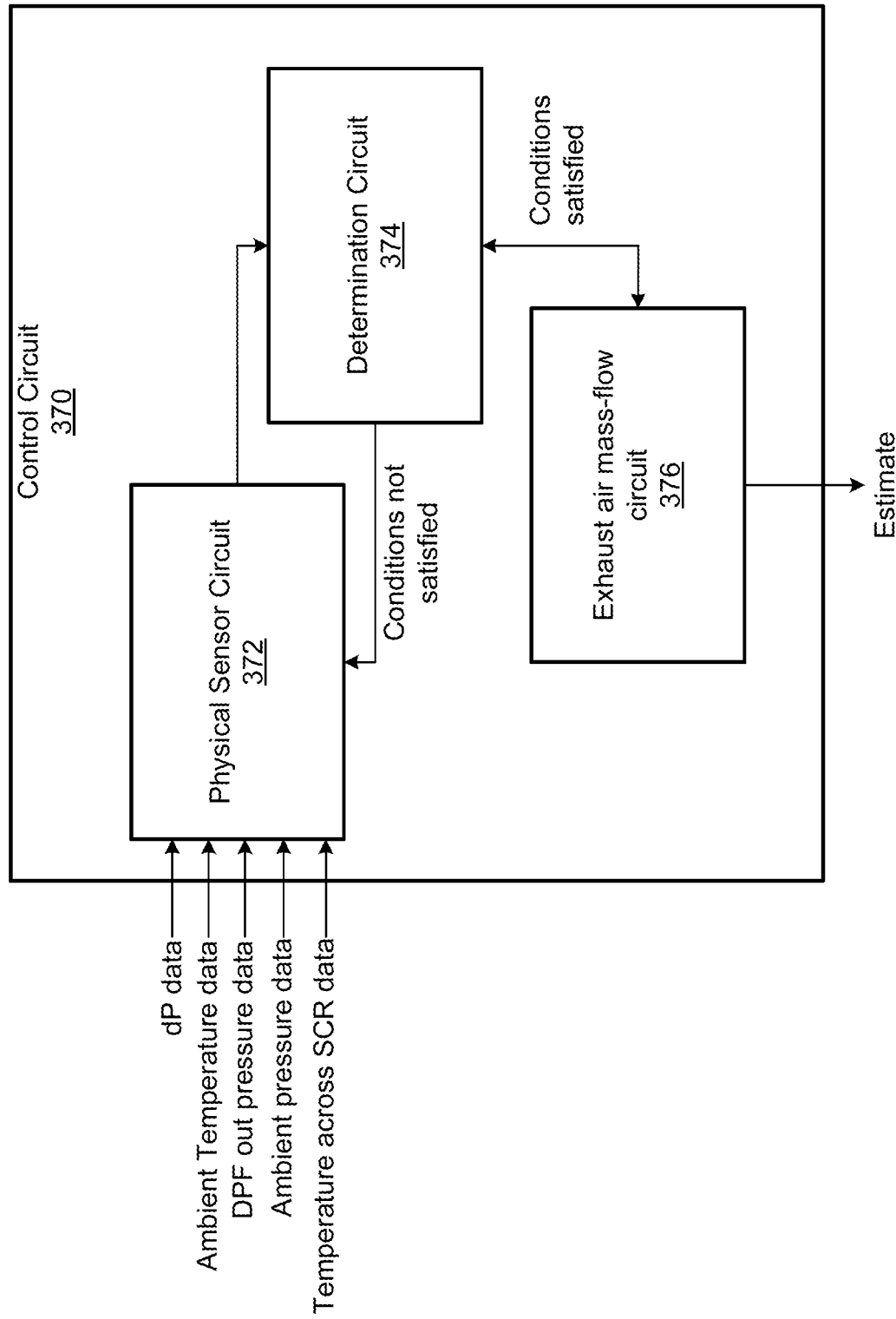
FIG. 3 is a schematic block diagram of one embodiment of a control circuit which can be included in a controller of an aftertreatment system.

The controller 170 can be a system computer of an apparatus or system which includes the aftertreatment system 200 (e.g., a vehicle or generator set, etc.). Such a computer can include, for example the computing device 530 described in detail herein with respect to FIG. 5. The controller 170 can include a control circuit which is in electrical communication with one or more of the components of the aftertreatment system 200 described herein and operable to perform the sensing functions described herein. For example, FIG. 3 is a schematic block diagram of a control circuit 370 which can be included in a controller 170. The control circuit 370 includes a physical sensor circuit 372, a determination circuit 374, and an exhaust air mass-flow circuit 376.

The physical sensor circuit 372 is configured to receive a first output value from one or more physical sensors (e.g., a temperature sensor 214, a pressure sensor 216, an ambient temperature sensor 218 and/or an ambient pressure sensor 222 which is operatively coupled to an aftertreatment system.

In some embodiments, the determination circuit 374 is configured to interpret a first output value from the physical level sensor and a first temperature output value from the temperature sensor. The determination circuit 374 is configured to determine if temperature data indicative of a temperature of the SCR is available. The determination circuit 374 is configured to analyze values of a temperature sensor operatively coupled to an SCR to determine if it is valid data from a physical temperature sensor. Analyzing values of a temperature sensor to determine if it is valid data can include comparing the values to one or more threshold values, comparing the values to a range of possible values, comparing the values to a range of predicted values based on other, known temperatures in the system, determining the volatility of the values is below a threshold, and the like. The determination circuit 374 is configured to receive a signal indicating a physical temperature sensor is communicatively coupled to a processing circuit (e.g., a controller 170 or control circuit 370).

In some embodiments, the determination circuit 374 is configured to determine if pressure data from the outlet of the DPF is available. Incoming values of a pressure sensor operatively coupled to an outlet of a DPF are analyzed to determine if it is valid data from a physical pressure sensor. A signal can be received indicating a physical pressure sensor is communicatively coupled to a processing circuit (e.g., a controller 170 or control circuit 370).

In some embodiments, the determination circuit 374 is configured to determine if ambient pressure sensor data is available. The determination circuit 374 can be configured to determine if ambient pressure data is being measured using a pressure sensor providing pressure sensor data. The determination circuit 374 can be configured to determine if the ambient pressure data is measured using a dedicated pressure sensor. The determination circuit 374 can be configured to analyze incoming values of an ambient pressure sensor to determine if it is valid data from a physical pressure sensor. The determination circuit 374 can also be configured to receive a signal indicating a physical pressure sensor is communicatively coupled to a processing circuit (e.g., a controller 170 or control circuit 370).

In some embodiments, the determination circuit 374 is configured to determine if data from two temperatures sensors across the SCR is available. The determination circuit 374 can be configured to determine if temperature data indicative of a temperature of the input and/or output of the SCR is available. The determination circuit 374 can be configured to analyze incoming values of at least two temperature sensors operatively coupled to either an input or output of an SCR respectively to determine if the data from at least two physical temperature sensors is valid. The determination circuit 374 can be configured to receive a signal indicating the at least two physical temperature sensors is communicatively coupled to a processing circuit (e.g., a controller 170 or control circuit 370).

In some embodiments, the determination circuit 374 is configured to determine if one of conditions (a) available dP sensor data and temperature sensor data, (b) available temperature sensor data, DPF out pressure sensor data, and ambient pressure sensor data, or (c) available ambient pressure sensor data and data from two temperature sensors across an SCR is satisfied. The determination circuit 374 can be configured to send a signal to an estimation circuit (e.g., an exhaust air mass-flow circuit 376) configured to calculate an estimate using one of the combination of available sensor data. The determination circuit 374 can be configured to send a signal to an estimation circuit (e.g., an exhaust air mass-flow circuit 376) configured to calculate an estimate using one of the combination of available sensor data if direct sensor data of the exhaust air mass-flow is also available to compare to the estimate of the exhaust air mass-flow.

The determination circuit 374 can be configured to determine if at least one of the above conditions are satisfied. The determination circuit 374 can be configured to determine that if any of the various combinations of data above are available, the conditions are satisfied. The determination circuit 374 can be configured to determine that if a plurality of any of the various combinations of data above are available, the conditions are satisfied. The determination circuit 374 can be configured to continue to monitor available sensor data until one of the conditions is satisfied.

In some embodiments, the exhaust air mass-flow circuit 376 is configured to calculate an estimate of an exhaust air mass-flow of an aftertreatment system. The exhaust air mass-flow circuit 376 can be configured to estimate the exhaust air mass-flow using temperature sensor data and differential pressure across the SCR data. The exhaust air mass-flow circuit 376 can be configured to estimate the exhaust air mass-flow by calculating the differential pressure using a separate dP sensor operably connected to the SCR. The SCR, being a flow-through catalyst, acts as a flow restriction device. For such a system, the exhaust air mass-flow circuit 376 can be configured to estimate the mass-flow using the differential pressure across the SCR.

In some embodiments, the exhaust air mass-flow circuit 376 is configured to estimate the exhaust air mass-flow using temperature sensor data, DPF out pressure sensor data, and ambient pressure sensor data. The SCR, being a flow-through catalyst, acts as a flow restriction device. For such a system, the exhaust air mass-flow circuit 376 can be configured to estimate the mass-flow by calculating the differential pressure across the SCR.

In some embodiments, the exhaust air mass-flow circuit 376 is configured to estimate the exhaust air mass-flow using ambient pressure sensor data and data from two temperature sensors across an SCR. In some embodiments, the SCR, being a flow-through catalyst, acts as a flow restriction device. For such a system, the exhaust air mass-flow circuit 376 can be configured to estimate the mass-flow by calculating the differential pressure across the SCR.

Figure 4:
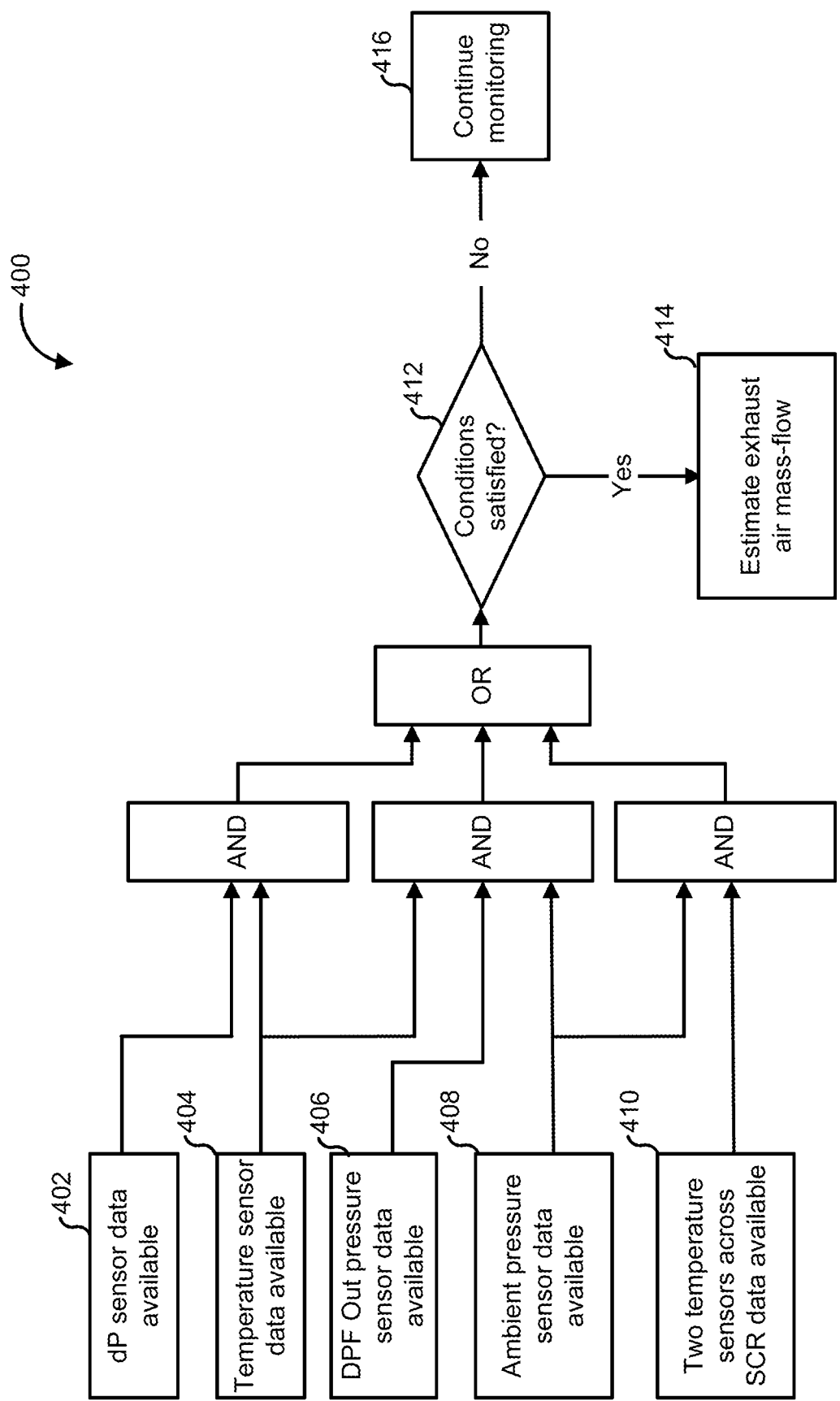
FIG. 4 is a schematic flow diagram of a method for determining an estimate of exhaust air mass-flow depicted according to an example embodiment.

FIG. 4 is a schematic flow diagram of an example method 400 for determining an estimate of exhaust air mass-flow depicted according to an example embodiment. The operations of the method 400 can be stored in the form of instructions on a non-transitory CRM (e.g., the main memory 536, read only memory (ROM) 538 or storage device 540 included in the computing device 530 of FIG. 5). The CRM can be included in a computing device (e.g., the computing device 530) which is configured to execute the instructions stored on the CRM to perform the operations of the method 400. In some embodiments, the controller 170 or control circuit 370 is configured to perform the operations of the method 400.

The method 400 includes determining if dP sensor data is available at 402 and if temperature sensor data is available at 404. The method 400 includes determining if temperature sensor data is available at 404, if DPF Out pressure sensor data is available at 406, and if ambient pressure sensor data is available at 408. The method 400 includes determining if ambient pressure sensor data is available at 408 and if data from two temperature sensors across the SCR is available at 410. The method 400 includes determining if (a) dP sensor data is available at 402 and temperature sensor data is available at 404 or (b) temperature sensor data is available at 404, DPF Out pressure sensor data is available at 406, and ambient pressure sensor data is available at 408 or (c) ambient pressure sensor data is available at 408 and data from two temperature sensors across the SCR is available at 410.

Continuing with FIG. 4 and in more detail, dP sensor data is available at 402. The differential pressure across an SCR is measured using a dedicated dP sensor providing differential pressure data. The differential pressure across a DOC may also be measured using a dedicated dP sensor. A determination is made if dP sensor data is available. Incoming values of dP sensor data can be analyzed to determine if it is valid data from a physical dP sensor. A signal can be received indicating a physical dP sensor is communicatively coupled to a processing circuit (e.g., a controller 170 or control circuit 370).

Temperature sensor data is available at 404. Temperature data is measured using a temperature sensor providing temperature sensor data. The temperature data can be measured using a dedicated temperature sensor operatively coupled to an SCR. A determination is made if temperature data indicative of a temperature of the SCR is available. Incoming values of a temperature sensor operatively coupled to an SCR can be analyzed to determine if it is valid data from a physical temperature sensor. A signal can be received indicating a physical temperature sensor is communicatively coupled to a processing circuit (e.g., a controller 170 or control circuit 370).

DPF Out pressure sensor data is available at 406. Temperature data can be measured using a pressure sensor providing pressure sensor data. The pressure data can be measured using a dedicated pressure sensor operatively coupled to an outlet of a DPF. A determination is made if pressure data from the outlet of the DPF is available. Incoming values of a pressure sensor operatively coupled to an outlet of a DPF can be analyzed to determine if it is valid data from a physical pressure sensor. A signal can be received indicating a physical pressure sensor is communicatively coupled to a processing circuit (e.g., a controller 170 or control circuit 370).

Ambient pressure sensor data is available at 408. Ambient pressure data can be measured using a pressure sensor providing pressure sensor data. The pressure data may also be measured using a dedicated pressure sensor. A determination is made if ambient pressure data is available. Incoming values of an ambient pressure sensor can be analyzed to determine if it is valid data from a physical pressure sensor. A signal can be received indicating a physical pressure sensor is communicatively coupled to a processing circuit (e.g., a controller 170 or control circuit 370).

Data from two temperatures sensors across the SCR is available at 410. Temperature data can be measured using at least two temperature sensors providing temperature sensor data. The temperature data can be measured using a dedicated temperature sensor operatively coupled to an input of an SCR and a dedicated temperature sensor operatively coupled to an output of the SCR. A determination is made if temperature data indicative of a temperature of the input and/or output of the SCR is available. In some, incoming values of the at least two temperature sensor operatively coupled to either an input or output of an SCR is analyzed to determine if it is valid data from at least two physical temperature sensors. A signal may be received indicating the at least two physical temperature sensors is communicatively coupled to a processing circuit (e.g., a controller 170 or control circuit 370).

It is determined if at least one of the above conditions are satisfied at 412. If any of the various combinations of data above are available, the conditions are satisfied. In some embodiments, if a plurality of any of the various combinations of data above are available, the conditions are satisfied. If the conditions are satisfied, the method continues to estimate exhaust air mass-flow at 414. If the conditions are not satisfied, the method continues to monitor available data at 416. For example, the aftertreatment system (e.g., the aftertreatment system 100) can be installed on a vehicle and configured to estimate exhaust air mass-flow if direct sensor data of exhaust air mass-flow is not available. The vehicle can include a vehicle speed sensor (e.g., the vehicle speed sensor 116) operatively coupled to a controller (e.g., the controller 170) configured to interpret a vehicle speed sensor output value to determine if the vehicle is moving or stationary.

If at least one of the conditions is satisfied at 412, then exhaust air mass-flow is estimated at 414. An estimate can be made by using dP sensor data and temperature sensor data. An estimate can be made using temperature sensor data, DPF out pressure sensor data, and ambient pressure sensor data. The estimate can be made using ambient pressure sensor data and data from two temperature sensors across an SCR. An estimate is determined if one of the combinations of sensor data is available. In some embodiments, a plurality of combinations of sensor data is available before an estimate is determined. Direct sensor data of the exhaust air mass-flow may be available when an estimate is made of the exhaust air mass-flow.

An exhaust air mass-flow is estimated at 414 using dP sensor data and temperature sensor data. An exhaust air mass-flow may be estimated at 414 using temperature sensor data and differential pressure across the SCR data. The differential pressure is calculated using a separate dP sensor operably connected to the SCR. The SCR, being a flow-through catalyst, acts as a flow restriction device. For such a system, the mass-flow can be estimated using the differential pressure across the SCR using the following equation (similar form to flow restriction across an orifice):

$$\dot{m} = k\sqrt{2\rho\Delta P}$$

where k is the flow coefficient implemented as $f(m_{est}\dot{})$ &
$\Delta P$ is the differential pressure.

The density can be estimated using the following equation:

$$\rho = \frac{P_{bed}}{RT_{bed}}$$

where R is the universal gas constant
The Newton-Raphson method is used to iteratively converge to a steady mass-flow estimate.
The embodiment is shown below:

$$f(\dot{m}) = \dot{m} - k\sqrt{2\rho\Delta P}$$

$$f^1(\dot{m}) = 1$$

$$\dot{m}_{est_{i+1}} = \dot{m}_{est_i} - \frac{f(\dot{m}_{est_i})}{f^1(\dot{m}_{est_i})}$$

$\Delta P$ can be determined from data obtained from a dP pressure sensor, the dP pressure sensor measuring the differential pressure across an SCR. $P_{Ambient}$ can be determined from data obtained from an ambient pressure sensor. $P_{bed}$ can be determined from data obtained about the pressure of the catalyst bed of the catalyst in the SCR. $T_{bed}$ can be determined from data obtained from a temperature sensor of the temperature of the catalyst bed of the catalyst in the SCR. In some embodiments, the k value can be mapped using steady-state data at different flow levels.

The exhaust air mass-flow is estimated at 414 using temperature sensor data, DPF out pressure sensor data, and ambient pressure sensor data. The SCR, being a flow-through catalyst, acts as a flow restriction device. For such a system, the mass-flow can be estimated using the differential pressure across the SCR using the following equation:

$$\dot{m} = k\sqrt{2\rho\Delta P}$$

where k is the flow coefficient implemented as $f(m_{est}\dot{})$ &
$\Delta P = P_{DPF\ Out} - P_{Ambient}$ The density can be estimated using the following equation:

$$\rho = \frac{P_{bed}}{RT_{bed}}$$

where R is the universal gas constant
The Newton-Raphson method is used to iteratively converge to a steady mass-flow estimate.
The embodiment is shown below:

$$f(\dot{m}) = \dot{m} - k\sqrt{2\rho\Delta P}$$

$$f^1(\dot{m}) = 1$$

$$\dot{m}_{est_{i+1}} = \dot{m}_{est_i} - \frac{f(\dot{m}_{est_i})}{f^1(\dot{m}_{est_i})}$$

$P_{DPF\ Out}$ can be determined from data obtained from a DPF out pressure sensor. $P_{Ambient}$ can be determined from data obtained from an ambient pressure sensor. $P_{bed}$ can be determined from data obtained about the pressure of the catalyst bed of the catalyst in the SCR. $T_{bed}$ can be determined from data obtained from a temperature sensor of the temperature of the catalyst bed of the catalyst in the SCR. The k value can be mapped using steady-state data at different flow levels.

An exhaust air-mass-flow can be estimated at 414 using ambient pressure sensor data and data from two temperature sensors across an SCR. The SCR, being a flow-through catalyst, acts as a flow restriction device. For such a system, the mass-flow can be estimated using the differential pressure across the SCR using the following equation:

$$\dot{m} = k\sqrt{2\rho\Delta P}$$

where k is the flow coefficient implemented as $f(m_{est}\dot{})$ &
$\Delta P = P_{DPF\ Out} - P_{Ambient}$ The density can be estimated using the following equation:

$$\rho = \frac{P_{bed}}{RT_{bed}}$$

where R is the universal gas constant
The Newton-Raphson method is used to iteratively converge to a steady mass-flow estimate.
The embodiment is shown below:

$$f(\dot{m}) = \dot{m} - k\sqrt{2\rho\Delta P}$$

$$f^1(\dot{m}) = 1$$

$$\dot{m}_{est_{i+1}} = \dot{m}_{est_i} - \frac{f(\dot{m}_{est_i})}{f^1(\dot{m}_{est_i})}$$

$P_{DPF\ Out}$ can be determined from data obtained from a first temperature sensor measuring the temperature of an inlet of an SCR, data obtained from a second temperature sensor of an outlet of the SCR, data obtained from an ambient pressure sensor of the ambient pressure, and by using the ideal gas law. $P_{bed}$ can be determined from data obtained about the pressure of the catalyst bed of the catalyst in the SCR and $T_{bed}$ can be determined from data obtained from a temperature sensor of the temperature of the catalyst bed of the catalyst in the SCR. The k value can be mapped using steady-state data at different flow levels.

Embodiments described herein relate to an aftertreatment component (such as a particulate filter, an SCR catalyst, etc.) that includes a flow dissipater that receives exhaust gases from an inlet and a substrate that receives the exhaust gases from the dissipater and provides filtered exhaust gases to an outlet. In many embodiments, the substrate surrounds the flow dissipater, and the flow dissipater is centered along a central axis of the substrate. The flow dissipater includes a plurality of perforations through which exhaust gases are expelled and a plurality of vanes that function to direct the exhaust gases expelled from the plurality of perforations. The plurality of perforations define an open area of the flow dissipater. The plurality of perforations are located and structured such that the open area of the flow dissipater is greatest proximate to the inlet and progressively decreases along the length of the flow dissipater towards the outlet. The flow dissipater and the substrate define a radial distance between the flow dissipater and the substrate. The flow dissipater and the substrate are structured to cooperatively increase this radial distance along the length of the flow dissipater towards the outlet.

In some embodiments, the flow dissipater is frustoconical in shape and has a diameter proximate the inlet which is greater than a diameter farther away (distal) from the inlet. In these embodiments, the substrate has a cylindrical shape. In other embodiments, the flow dissipater is cylindrical in shape and the substrate is frustoconical in shape. In these embodiments, the substrate has a diameter proximate the inlet which is less than a diameter farther away (distal) from the inlet.

In the embodiments described herein, the increasing radial distance combined with the decreasing open area facilitates the formation of a substantially uniform radial velocity profile on an inner surface of the substrate. In this way, a fluid distribution index associated with the particulate filter (or other aftertreatment component) may be increased and the pressure drop may be decreased compared to conventional filters. Additionally, in the case of a particulate filter, the design of the particulate filter described herein facilitates a decreased size and cost compared to many conventional filters.

Figure 5:
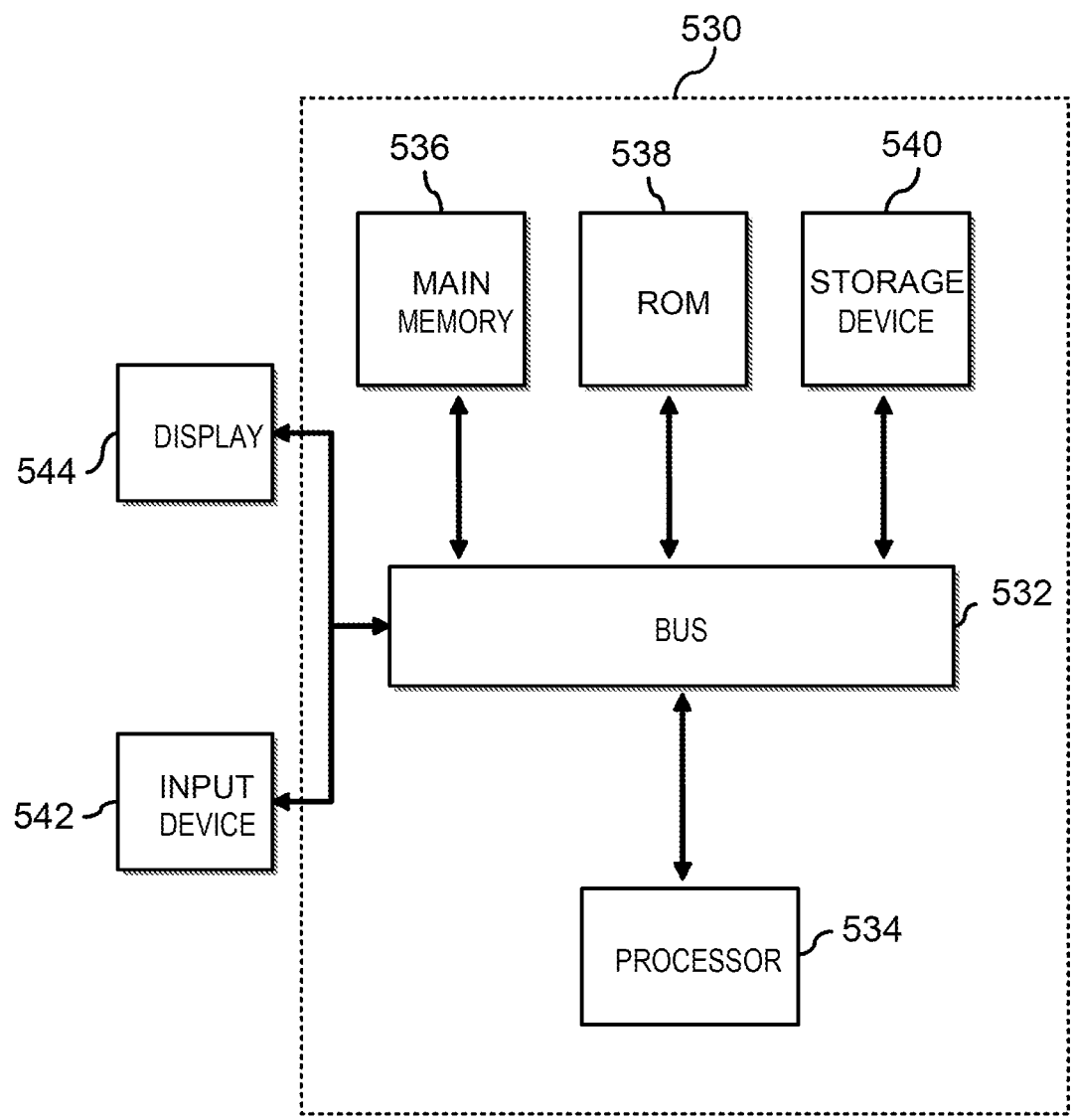
FIG. 5 is a schematic block diagram of a computing device according to an example embodiment.

FIG. 5 is a block diagram of a computing device 530 in accordance with an illustrative embodiment. The computing device 530 can be used to perform any of the methods or the processes described herein, for example the method 400. In some embodiments, the controller 170 can include the computing device 530. The computing device 530 includes a bus 532 or other communication component for communicating information. The computing device 530 can also include one or more processors 534 or processing circuits coupled to the bus for processing information.

The computing device 530 also includes main memory 536, such as a random access memory (RAM) or other dynamic storage device, coupled to the bus 532 for storing information, and instructions to be executed by the processor 534. Main memory 536 can also be used for storing position information, temporary variables, or other intermediate information during execution of instructions by the processor 534. The computing device 530 may further include a ROM 538 or other static storage device coupled to the bus 532 for storing static information and instructions for the processor 534. A storage device 540, such as a solid-state device, magnetic disk or optical disk, is coupled to the bus 540 for persistently storing information and instructions. For example, instructions for determining if a reductant in the reductant storage tank is frozen and/or determining the virtual reductant level can be stored in any one of the main memory 536 and/or storage device 540. In one embodiment, the processor 534 can also be configured to generate a fault code if a physical level sensor (e.g., the physical level sensor 112) is unable to detect an accurate physical level of the reductant in the reductant storage tank for an extended period of time. The fault code can be stored, for example be stored on the main memory 536 and/or the storage device 540 to be reported to a user when the computing device 530 is accessed. In other embodiments, the processor 534 can indicate to a user that the physical level sensor has malfunctioned by light a malfunction indicator lamp (MIL), for example a MIL included in the dashboard of a vehicle.

The computing device 530 may be coupled via the bus 532 to a display 535, such as a liquid crystal display, or active matrix display, for displaying information to a user. An input device 542, such as a keyboard or alphanumeric pad, may be coupled to the bus 532 for communicating information and command selections to the processor 534. In another embodiment, the input device 542 has a touch screen display 544.

According to various embodiments, the processes and methods described herein can be implemented by the computing device 530 in response to the processor 534 executing an arrangement of instructions contained in main memory 536 (e.g., the operations of the method 300). Such instructions can be read into main memory 536 from another non-transitory computer-readable medium, such as the storage device 540. Execution of the arrangement of instructions contained in main memory 536 causes the computing device 530 to perform the illustrative processes described herein. One or more processors in a multi-processing arrangement may also be employed to execute the instructions contained in main memory 536. In alternative embodiments, hard-wired circuitry may be used in place of or in combination with software instructions to effect illustrative embodiments. Thus, embodiments are not limited to any specific combination of hardware circuitry and software.

Although an example computing device has been described in FIG. 5, embodiments described in this specification can be implemented in other types of digital electronic circuitry, or in computer software, firmware, or hardware, including the structures disclosed in this specification and their structural equivalents, or in combinations of one or more of them.

Embodiments described in this specification can be implemented in digital electronic circuitry, or in computer software, firmware, or hardware, including the structures disclosed in this specification and their structural equivalents, or in combinations of one or more of them. The embodiments described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various example embodiments without departing from the scope of the present invention.

While this specification contains many specific embodiment details, these should not be construed as limitations on the scope of any inventions or of what may be claimed, but rather as descriptions of features specific to particular embodiments of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Construction of Exemplary Embodiments

While this specification contains many specific embodiment details, these should not be construed as limitations on the scope of what may be claimed but rather as descriptions of features specific to particular embodiments. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled," "in fluid communication," and the like, as used herein, mean the two components or objects have a pathway formed between the two components or objects in which a fluid, such as exhaust, water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another. As described herein, "preventing" should be interpreted as potentially allowing for de minimus circumvention (e.g., less than 1%) of the exhaust gases around the substrate or the flow dissipater.

It is important to note that the construction and arrangement of the system shown in the various example embodiments is illustrative only and not restrictive in character. All changes and modifications that come within the spirit and/or scope of the described embodiments are desired to be protected. It should be understood that some features may not be necessary, and embodiments lacking the various features may be contemplated as within the scope of the application, the scope being defined by the claims that follow. When the language "a portion" is used, the item can include a portion and/or the entire item unless specifically stated to the contrary.

What is claimed is:

1. An aftertreatment system, comprising:
   a selective catalytic reduction (SCR) system including at least one catalyst;
   a particulate filter fluidly coupled to the SCR system;
   a particulate filter out pressure sensor operatively coupled to an outlet of the particulate filter, the particulate filter out pressure sensor configured to measure a value of a pressure at the outlet of the particulate filter;
   a temperature sensor;
   an ambient pressure sensor; and
   a controller communicatively coupled with the particulate filter out pressure sensor, the controller configured to:
      determine a first output value from the particulate filter out pressure sensor, the first output value indicative of the value of the pressure at the outlet of the particulate filter;
      determine a first temperature output value from the temperature sensor, the first temperature output value indicative of a temperature of the SCR system;
      determine a second output value from the ambient pressure sensor, the second output value indicative of a value of an ambient pressure; and
      estimate an exhaust air mass-flow output from the aftertreatment system using the first output value from the particulate filter out pressure sensor, the first temperature output value from the temperature sensor, and the second output value from the ambient pressure sensor.

2. The aftertreatment system of claim 1, wherein estimating the exhaust air mass-flow output from the aftertreatment system comprises calculating a flow coefficient of the SCR system.

3. The aftertreatment system of claim 1, wherein estimating the exhaust air mass-flow output comprises calculating a flow coefficient of the SCR system and a density of the exhaust air mass-flow inside the SCR system.

4. The aftertreatment system of claim 3, wherein the density is estimated using $$\rho = \frac{P_{bed}}{RT_{bed}}$$

wherein R is the universal gas constant, $P_{bed}$ is determined from data obtained about the pressure of a catalyst bed of the catalyst in the SCR system, and $T_{bed}$ is determined from data obtained from a temperature sensor of the temperature of the catalyst bed of the catalyst in the SCR system.

5. The aftertreatment system of claim 4, wherein a value for k is obtained from a mapping of steady-state data at different flow levels.

6. The aftertreatment system of claim 2 further comprising an exhaust air mass-flow sensor, wherein a value of exhaust air mass-flow is obtained from the exhaust air mass-flow sensor and the controller is further configured to compare the estimate exhaust air mass-flow to the value of exhaust air mass-flow obtained from the exhaust air mass-flow sensor.

7. The aftertreatment system of claim 3, wherein the exhaust air mass-flow output is estimated using $\dot{m} = k\sqrt{2\rho\Delta P}$,
   wherein k is the flow coefficient implemented as $f(\dot{m}_{est})$, and
   $\Delta P$ is the differential pressure.

* * * * *